US011888352B2

(12) United States Patent
Urban (10) Patent No.: US 11,888,352 B2
(45) Date of Patent: Jan. 30, 2024

(54) DUAL-ROTOR ELECTRICALLY EFFICIENT MOTOR

(71) Applicant: Thomas Urban, Flagstaff, AZ (US)

(72) Inventor: Thomas Urban, Flagstaff, AZ (US)

(*) Notice: Subject to any disclaimer, the term of this patent is extended or adjusted under 35 U.S.C. 154(b) by 0 days.

(21) Appl. No.: 17/679,958

(22) Filed: Feb. 24, 2022

(65) Prior Publication Data

US 2022/0278576 A1  Sep. 1, 2022

Related U.S. Application Data

(60) Provisional application No. 63/154,472, filed on Feb. 26, 2021.

(51) Int. Cl.
| | |
|---|---|
| *H02K 1/2753* | (2022.01) |
| *H02K 16/02* | (2006.01) |
| *H02K 1/28* | (2006.01) |
| *H02K 21/22* | (2006.01) |
| *H02K 21/20* | (2006.01) |

(52) U.S. Cl.
CPC ............ *H02K 1/2753* (2013.01); *H02K 1/28* (2013.01); *H02K 16/02* (2013.01); *H02K 21/20* (2013.01); *H02K 21/22* (2013.01)

(58) Field of Classification Search
CPC ...... H02K 1/2753; H02K 1/27; H02K 1/2706; H02K 1/272; H02K 1/274; H02K 1/28; H02K 16/02; H02K 21/20; H02K 21/22; H02K 21/12
See application file for complete search history.

(56) References Cited

U.S. PATENT DOCUMENTS

| | | | | |
|---|---|---|---|---|
| 3,895,245 | A  * | 7/1975 | Bode ...................... | H02K 25/00 310/46 |
| 10,084,365 | B1 * | 9/2018 | Pandya .................. | H02K 47/18 |
| 2020/0231275 | A1 * | 7/2020 | Groman .............. | F04D 25/0606 |

* cited by examiner

*Primary Examiner* — Tulsidas C Patel
*Assistant Examiner* — Joshua Kiel M Rodriguez
(74) *Attorney, Agent, or Firm* — Polsinelli PC (57) ABSTRACT

Various embodiments of a system and associated method for an electrically efficient motor including two parallel shafts, one or more rotors including a plurality of alternating permanent magnets mounted on each shaft, and an electromagnet operable for switching polarities in order to keep the one or more rotors, and consequently the two parallel shafts, in rotational motion.

12 Claims, 10 Drawing Sheets

DUAL-ROTOR ELECTRICALLY EFFICIENT MOTOR

CROSS-REFERENCE TO RELATED APPLICATIONS

This is a US Non-Provisional patent application that claims benefit to U.S. Provisional Patent Application Ser. No. 63/154,472, filed 26 Feb. 2021, which is herein incorporated by reference in its entirety.

FIELD

The present disclosure generally relates to electric motors, and in particular, to a system and associated method for an improved electrically efficient electric motor that uses a dual rotor arrangement and a central shared electromagnet.

BACKGROUND

Historically, most electric motors contain a single rotor positioned within a stator. One of these, the rotor or stator, includes permanent magnets while the other includes electromagnets. This configuration has served the world well for over a century. Since 1984, much more powerful magnets are available so that today, a permanent magnet can hold 180 lbs. with only one square inch of surface area. Conventional motors have not been able to take full advantage of this innovation because the increased power of the permanent magnets (PM) must always be matched by the power requirements of the electromagnets (EM). Any PM is naturally attracted to an EM core even with little or no electrical power. To continue rotating, the EM must then generate a magnetic field strong enough to release and repel the PM. This step is what consumes the most electrical energy in a motor.

It is with these observations in mind, among others, that various aspects of the present disclosure were conceived and developed.

Corresponding reference characters indicate corresponding elements among the view of the drawings. The headings used in the figures do not limit the scope of the claims.

DETAILED DESCRIPTION

Various embodiments of a system and associated method for an improved electrically efficient motor are disclosed herein. In particular, the motor includes an electromagnet assembly located proximate a pair of shafts, each shaft of the pair of shafts defining one or more opposing rotors including a plurality of permanent magnets for magnetic interaction with the electromagnet assembly and resultant rotation of each shaft. The motor leverages a dual-rotor arrangement such that permanent magnets (PM) associated with the rotors contribute a greater percentage of rotational force produced by the motor, thereby reducing the power requirements of electromagnets (EM) involved. By using at least two rotors, each associated with one of a pair of shafts and one central EM, less electrical power is required to produce the same result as a conventional motor. The rotors including permanent magnets and associated gears are mounted on parallel shafts such that "like" poles of each permanent magnet align between the rotors and are always repelling each other. The EM is positioned between the pair of shafts to neutralize repelling forces between the permanent magnets associated with each rotor. When energized with a first pole, the EM attracts approaching PMs on both rotors together. When the EM switches to an opposite second pole, the EM repels those same PM's which are also repelling each other while attracting a new pair of approaching PMs, adding to the rotational force produced by the motor. Referring to the drawings, embodiments of an improved electrically efficient motor are illustrated and generally indicated as 100 in FIGS. 1-9.

Figure 1:
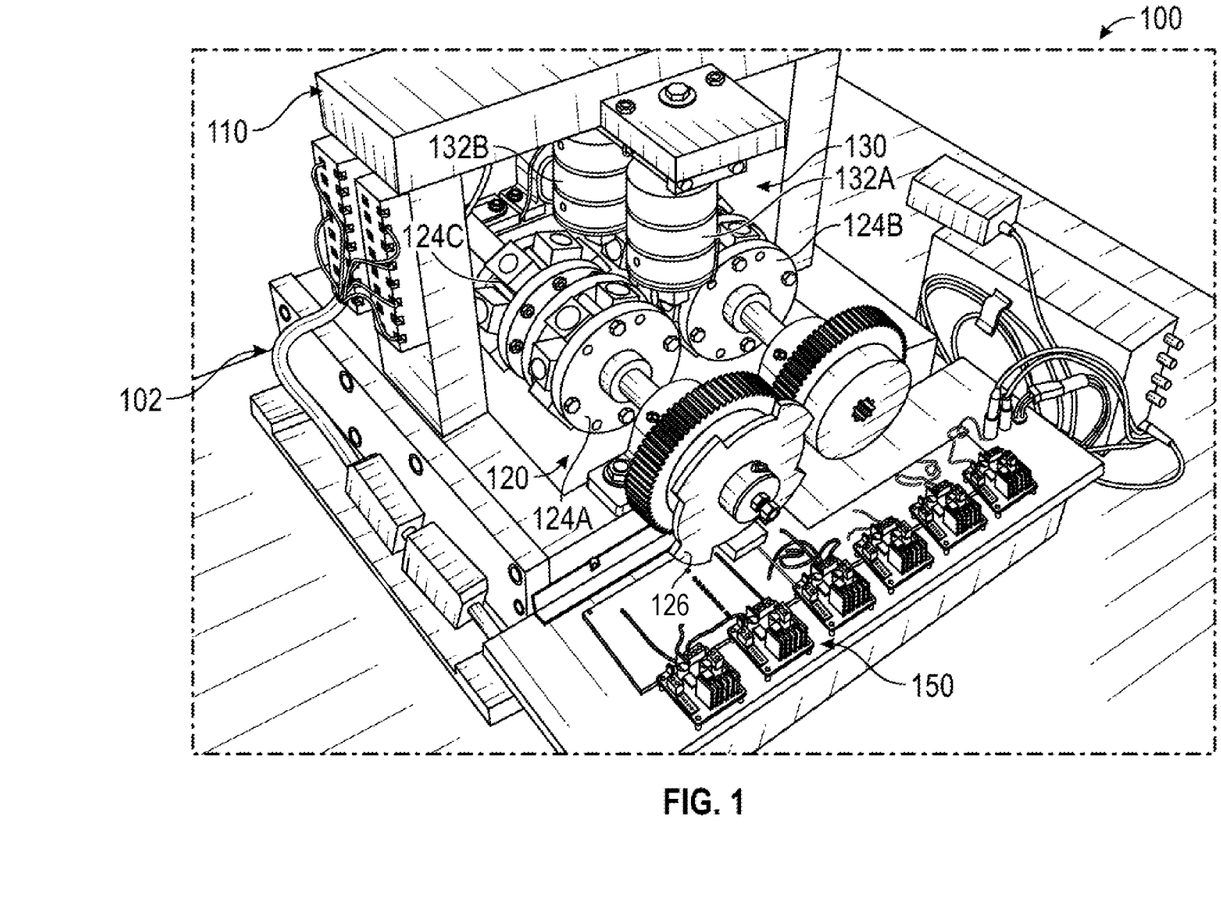
FIG. 1 is an illustration showing a perspective view of an improved motor including a dual-rotor assembly sharing a central electromagnet assembly and a control system for powering the electromagnet.
Figure 2A:
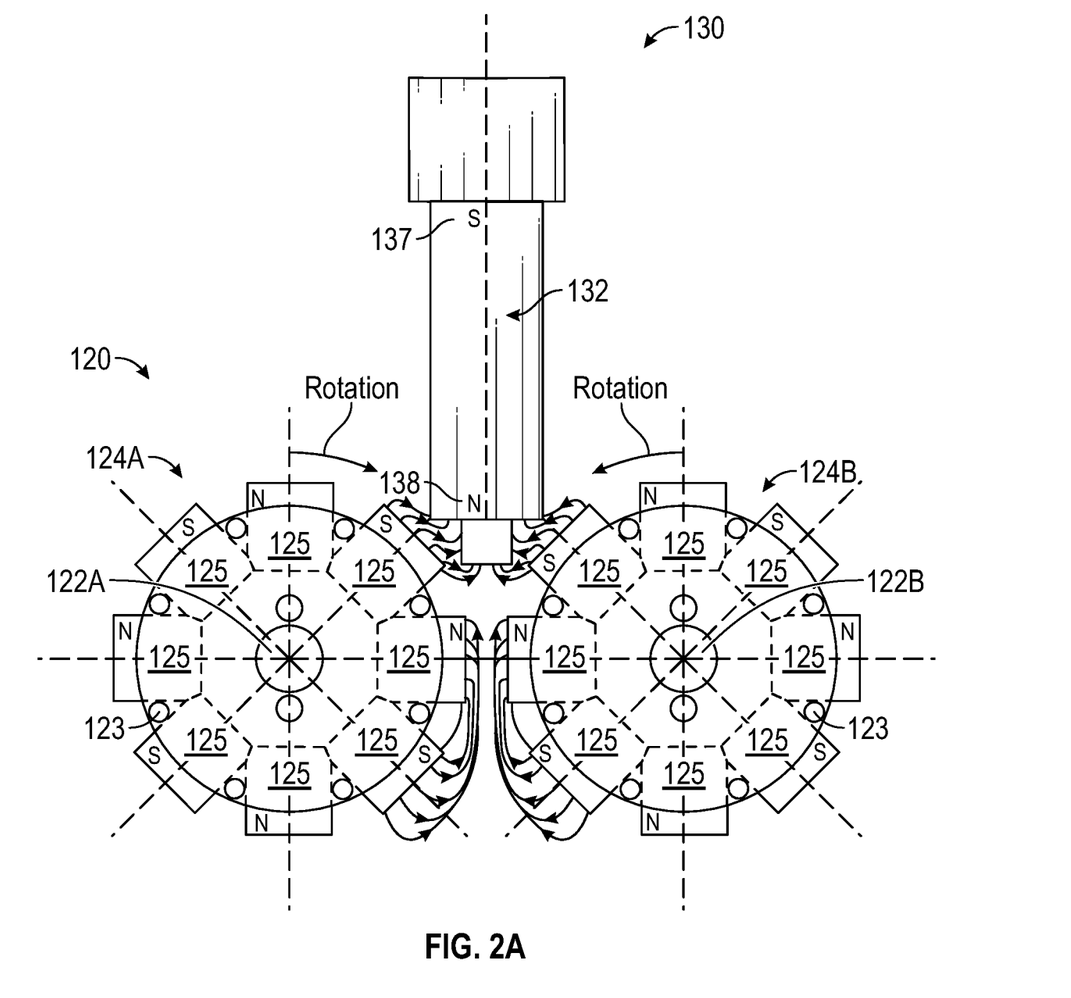
FIGS. 2A and 2B are schematic illustrations for a first polarity arrangement and a second polarity arrangement showing magnetic field lines associated with the dual-rotor assembly of the motor of FIG. 1.
Figure 2B:
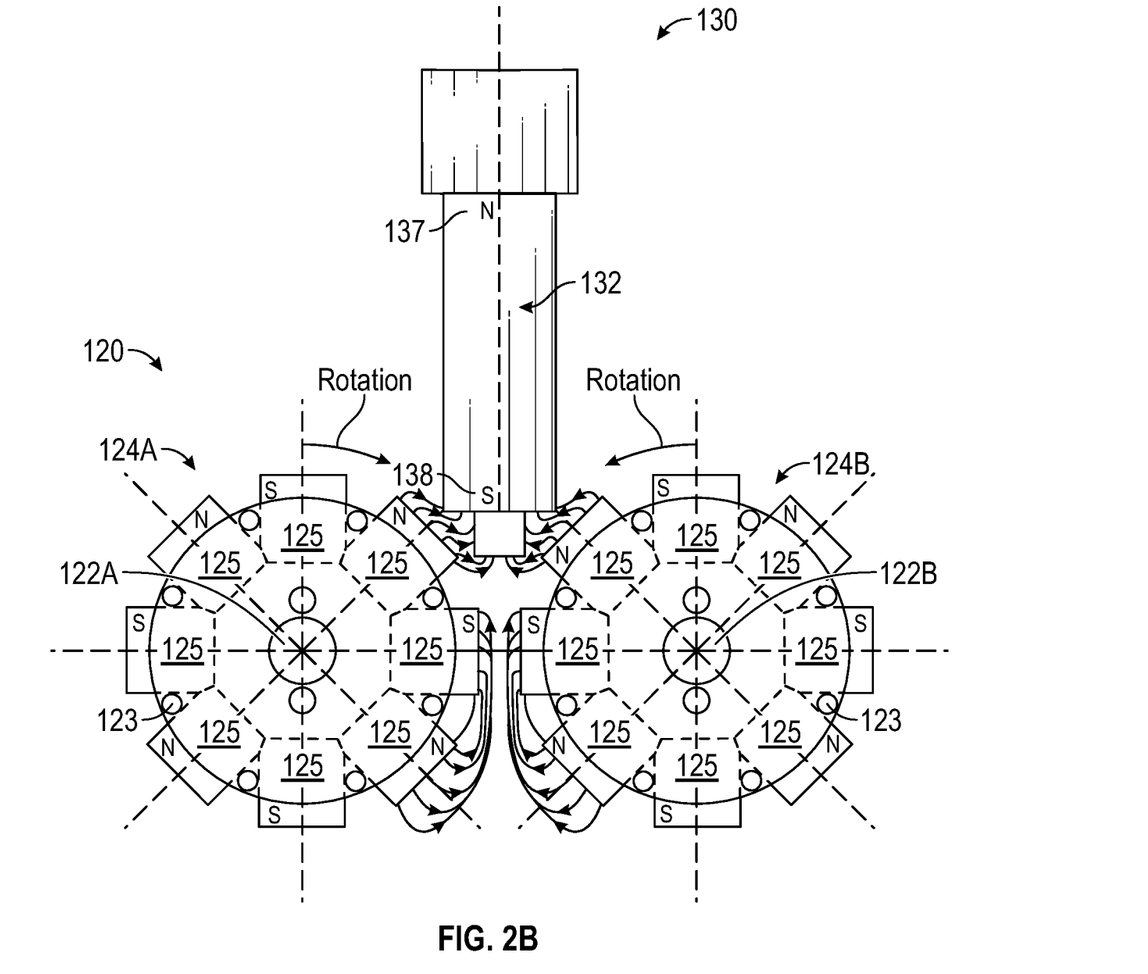
Figure 3:
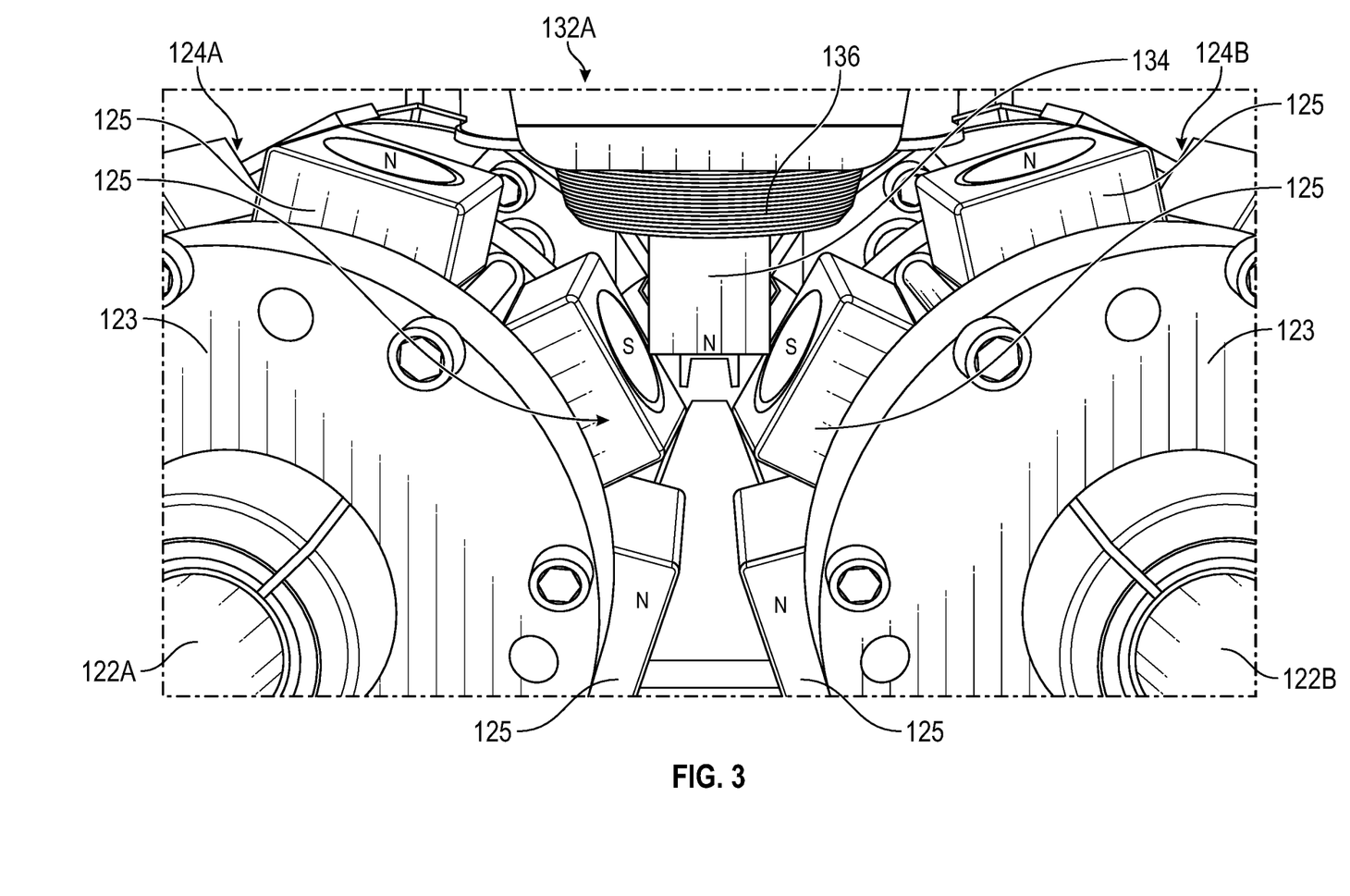
FIG. 3 is an illustration showing a magnified view of the central electromagnet assembly oriented equidistantly between the rotors of the rotor assembly of the motor of FIG. 1.

Referring to FIGS. 1-3, an improved electrically efficient motor 100 is illustrated defining a dual-rotor assembly 120 and an electromagnet assembly 130 positioned above the dual-rotor assembly 120 mounted on a base 102. As illustrated specifically in FIGS. 2A and 2B, the dual-rotor assembly 120 includes at least two opposing rotors 124 (124A and 124B in FIGS. 2A and 2B) mounted on a pair of parallel shafts 122A and 122B such that each opposing rotor 124 rotates about its respective parallel shaft 122. The electromagnet assembly 130 is positioned above and equidistantly between the pair of parallel shafts 122A and 122B for magnetic interaction with each rotor 124A and 124B, and in some embodiments is supported above the base 102 by a bridge 110. In some embodiments, the electromagnet assembly 130 includes at least one electromagnet stack 132 (132A in FIGS. 2A and 2B); in particular each electromagnet stack 132 is associated with a respective pair of opposing rotors 124. Each electromagnet stack 132 defines a distal portion 138 and a proximal portion 137 and generates a magnetic field such that the distal portion 138 and the proximal portion 137 each define switchable and opposing magnetic polarities, a mechanism which will be described in greater detail below. Each electromagnet stack 132 electrically communicates with an electromagnet power assembly 150 (FIGS. 1 and 9) configured to generate a north or south magnetic field at the distal portion 138 of the electromagnet stack 132. As illustrated in FIGS. 2A and 2B, each rotor 124 includes a plurality of permanent magnets 125, each permanent magnet 125 of the plurality of permanent magnets 125 defining alternating north and south polarities and oriented annularly about each parallel shaft 122A and 122B. Each permanent magnet 125 of the plurality of permanent magnets 125 is configured for magnetic interaction with the electromagnet assembly 130 to generate simultaneous rotational motion of both parallel shafts 122. As discussed above, the electromagnet stack 132 is positioned between the pair of parallel shafts 122A and 122B to neutralize repelling forces between the permanent magnets 125 associated with each rotor 124A and 124B. As shown in FIG. 2A, when energized with a "north" pole, the electromagnet stack 132 attracts approaching permanent magnets 125 that are energized with "south" poles on both rotors 124A and 124B together. Conversely, when the electromagnet stack 132 switches to an opposite "south" pole, the electromagnet stack 132 repels those same "north" permanent magnets 125 which are also repelling each other while attracting a new pair of approaching "south" permanent magnets 125, adding to the rotational force produced by the motor 100. The electromagnet power assembly 150 facilitates rapid switching of the poles of the electromagnet stack 132 to actuate the rotors 124.

Figure 4:
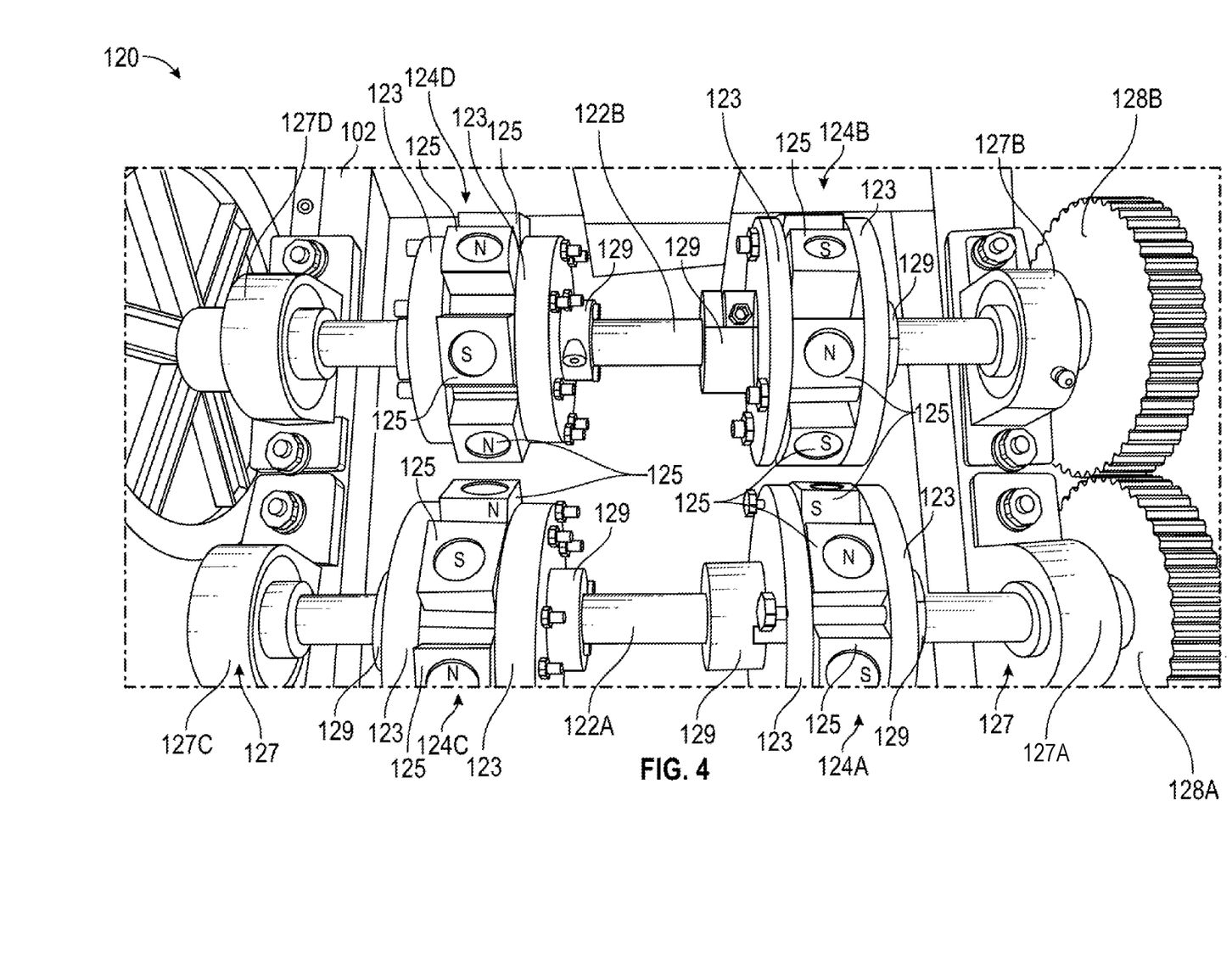
FIG. 4 is an illustration showing a top view of a rotor assembly of the motor of FIG. 1.
Figure 5:
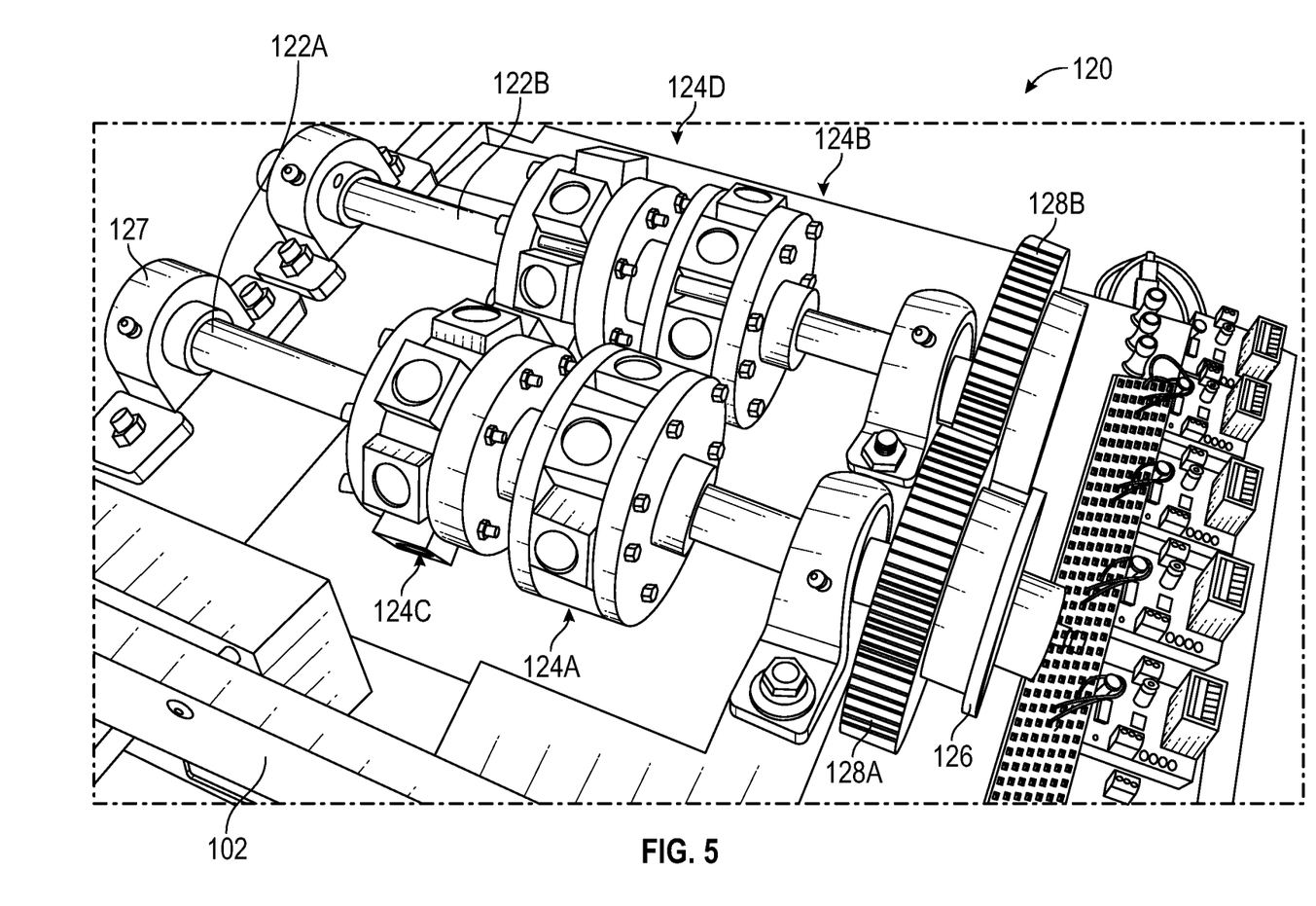
FIG. 5 is an illustration showing a top perspective view of the rotor assembly of FIG. 4.
Figure 6:
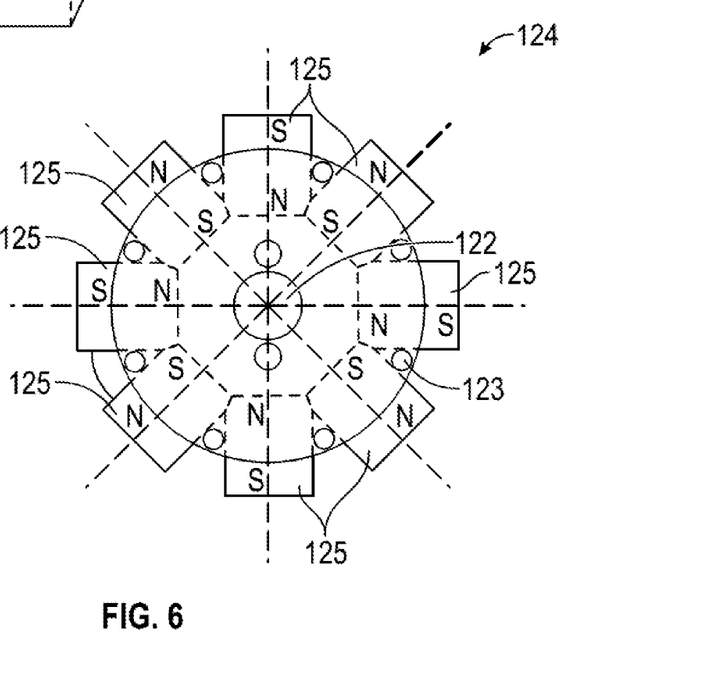
FIG. 6 is a schematic illustration showing the rotor wheel and associated polarities of a plurality of permanent magnets of a rotor wheel of the rotor assembly of FIG. 5.

Referring to FIGS. 4-6, the rotor assembly 120 includes the pair of parallel shafts 122A and 122B horizontally and rotatably mounted on base 102. As illustrated, the rotors 124 are each mounted around a respective parallel shaft 122A and 122B such that rotation of the rotors 124 about their respective parallel shafts 122A and 122B results in rotation of the parallel shafts 122A and 122B. Referring directly to FIGS. 4 and 5, in some embodiments, each parallel shaft 122A and 122B is associated with multiple rotors 124; in particular, rotor assembly 120 of FIGS. 4 and 5 includes rotors 124A and 124C mounted on a first parallel shaft 122A and rotors 124B and 124D mounted on a second parallel shaft 122B. During operation, rotor 124A of shaft 122A is associated with rotor 124B of shaft 122B and rotor 124C of shaft 122A is associated with rotor 124D of shaft 122B to form two pairs of opposing rotors 124.

Referring to FIGS. 2A, 2B, 4 and 6, each rotor 124 includes the plurality of permanent magnets 125 positioned between two discs 123 for structural stability. In particular, the plurality of permanent magnets 125 are arranged in an alternating polarity fashion such that a polarity of one permanent magnet 125 of the plurality of permanent magnets 125 is opposite from adjacent permanent magnets 125. For example, an arrangement of polarities of each of the plurality of permanent magnets 125 for a rotor 124 having 8 permanent magnets 125 would be North-South-North-South-North-South-North-South. When arranged according to FIG. 4, each pair of rotors 124 (rotors 124A and 124B; rotors 124C and 124D) is arranged such that like poles of the plurality of permanent magnets 125 face each other and each pair of rotors 124 are naturally repulsed away from one another.

Figure 8:
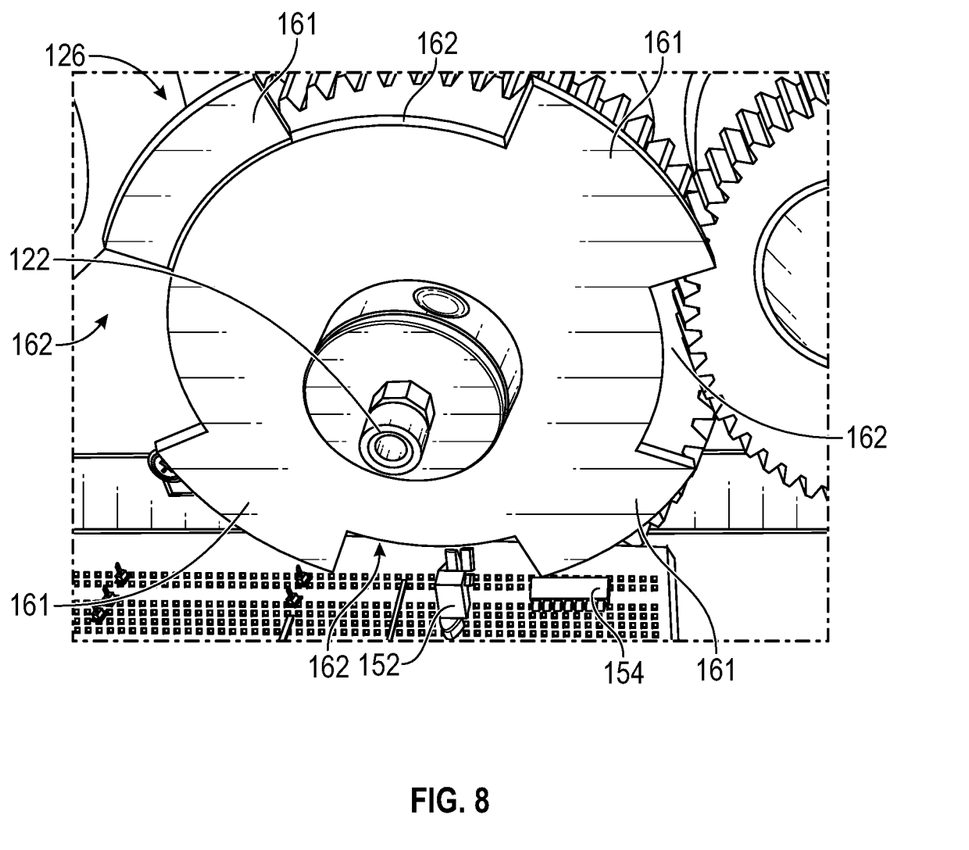
FIG. 8 is an illustration showing a timing gear associated with the rotor assembly of FIG. 4 for proper timing of an electromagnet power assembly.

In some embodiments, the discs 123 are comprised of a non-ferromagnetic material such as aluminum that will not interfere with electromagnetic operation of the motor. Components of a single rotor 124 of the plurality of rotors 124 including the plurality of permanent magnets 125 and the pair of discs 123 are held together by a respective pair of shaft clamps 129 to ensure that as each rotor 124 is rotated by its respective interaction with the electromagnet assembly 130, the associated shaft 122 is also rotated. Referring to FIG. 5, each parallel shaft 122 is rotatably mounted to the base 102 by a respective pair of pillow clamps 127 (shaft 122A by pillow clamps 127A and 127C; shaft 122B by pillow clamps 127B and 127D). As shown in FIGS. 4 and 5, each shaft 122A and 122B is associated with a respective spur gear 128A and 128B to ensure that each shaft 122A and 122B of the pair of parallel shafts 122 rotates simultaneously with one another. In some embodiments, as shown in FIGS. 5 and 8, a timing gear 126 is included on at least one shaft 122A or 122B of the pair of parallel shafts 122 to control a pole switching frequency to the electromagnet power assembly 150 (FIG. 9) which will be discussed in greater detail below.

Figure 7:
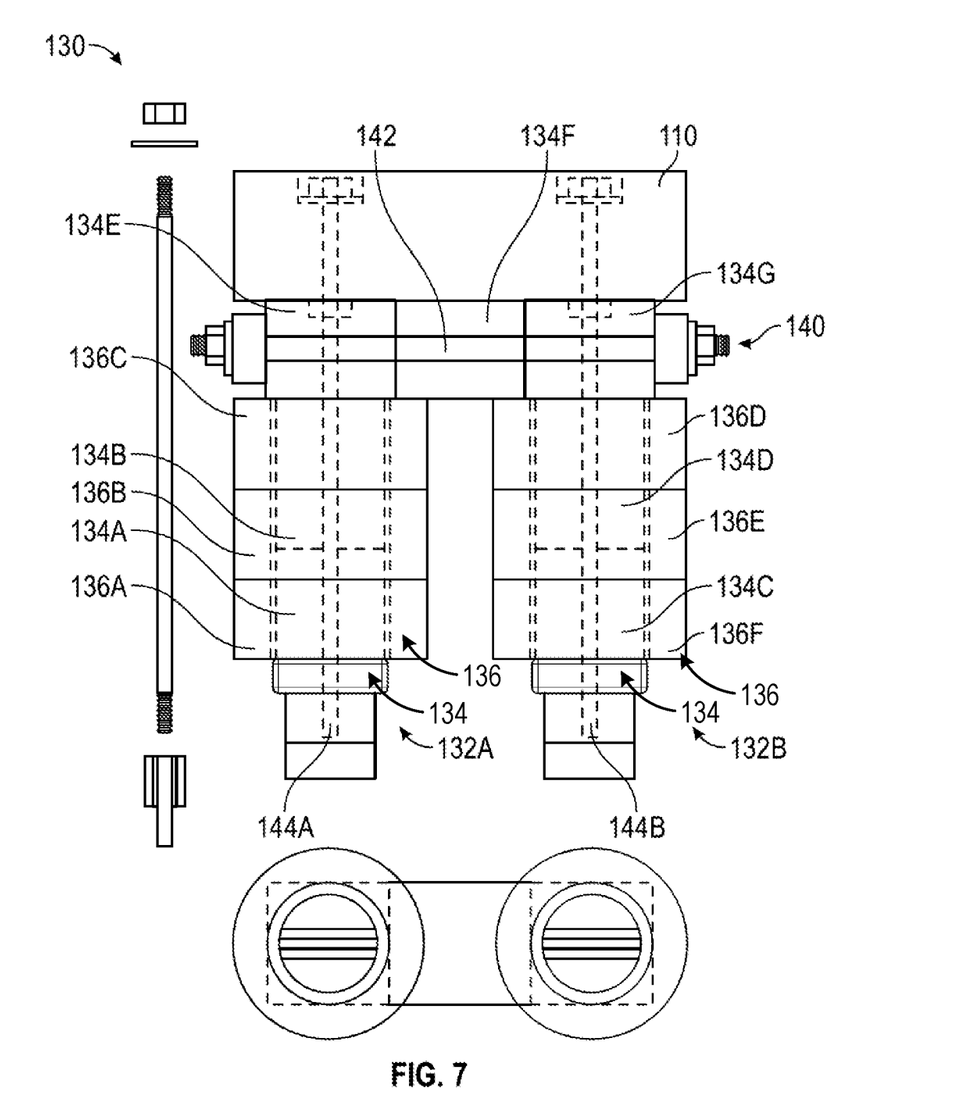
FIG. 7 is a schematic illustration showing a front view of the electromagnet assembly of FIG. 1 with a plurality of ferromagnetic cores in phantom.
Figure 9:
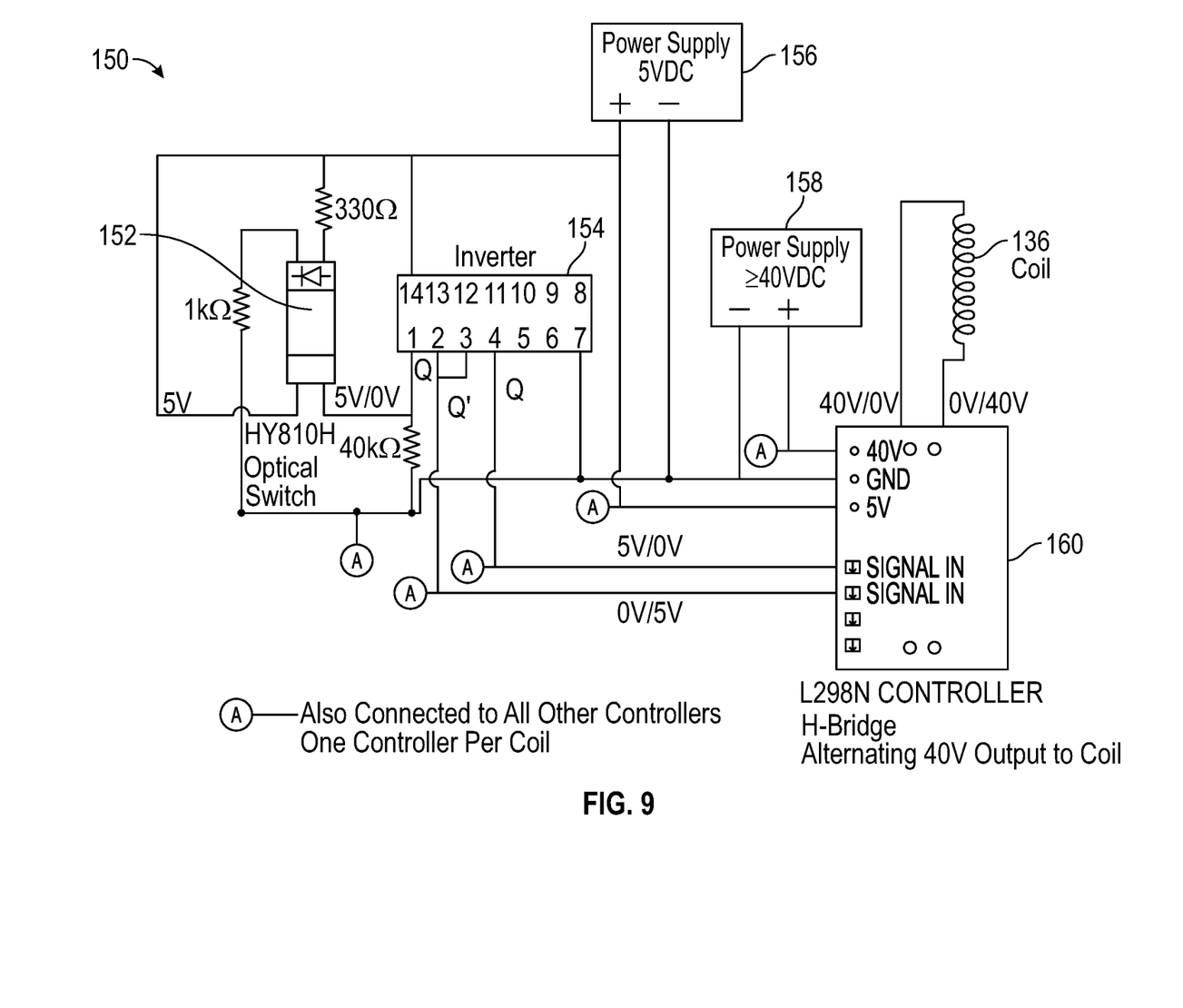
FIG. 9 is a schematic diagram showing the electromagnet power assembly of the motor of FIG. 1.

Referring to FIGS. 1-3 and 7, the electromagnet assembly 130 is positioned above the rotor assembly 120 between each pair of opposing rotors 124, and is in electrical communication with the electromagnet power assembly 150 of FIG. 9. Electromagnet assembly 130 includes one or more electromagnet stacks 132 in contact with an electromagnet mounting assembly 140. Due to this arrangement, a single electromagnet stack 132 of the electromagnet assembly 130 can rotate one opposing pair of rotors 124, producing rotational motion of both parallel shafts 122. As shown, in one embodiment of the motor assembly 100 featuring two pairs of rotors 124 (rotor 124A in operative association with rotor 124B and rotor 124C in operative association with rotor 124D of FIGS. 4 and 5), a first electromagnetic stack 132A of the one or more electromagnetic stacks 132 is associated with opposing rotors 124A and 124B, and a second electromagnetic stack 132B of the one or more electromagnetic stacks 132 is associated with opposing rotors 124C and 124D. The electromagnet assembly 130 includes one or more electromagnet stacks 132, each electromagnet stack 132 including at least one outer coil 136 wrapped around at least one ferromagnetic core 134 as illustrated in FIG. 7. As specifically shown in FIGS. 1-3, each electromagnet stack 132 is positioned directly above an opposing pair of rotors 124 such that as the electromagnet stack 132 switches polarities, the opposing rotors 124 are caused to rotate towards each other.

As specifically illustrated in the embodiments of FIG. 7, the electromagnet assembly 130 including two electromagnet stacks 132A and 132B of the one or more electromagnetic stacks 132 each include a plurality of ferromagnetic cores 134A-134G (collectively, ferromagnetic cores 134) arranged in a magnetic circuit and a plurality of outer coils 136A-136F (collectively, outer coils 136) wrapped around the plurality of ferromagnetic cores 134, specifically the ferromagnetic cores 134A-D of the plurality of ferromagnetic cores 134 which are associated with the electromagnet stacks 132A and 132B. In one embodiment, each electromagnet stack 132A and 132B is clamped together by a respective vertical rod 144A and 144B. As shown, electromagnet mounting assembly 140 includes additional ferromagnetic cores 134E-G of the plurality of ferromagnetic cores 134 which are clamped together by a horizontal rod 142 to complete the magnetic circuit. It should be noted that the total number of ferromagnetic cores 134 does not necessarily matter and that one ferromagnetic core 134 can be used for each electromagnet stack 132 depending on the size and strength of the ferromagnetic core 134.

As will be discussed in greater detail below, each outer coil 136 of the plurality of outer coils 136 electrically communicates with the electromagnet power assembly 150 of FIG. 9 to generate an electric current through each respective outer coil 136 and thus generate a magnetic field through principles of electromagnetic induction. To switch polarities of an electromagnet stack 132 of the one or more electromagnetic stacks 132, the electromagnet power assembly 150 reverses a direction of the current applied through each outer coil 136. Note that a number of outer coils 136 can also vary, and that a number of controllers 160 of the electromagnet power assembly 150 corresponds with the number of outer coils 136 depending on the needs of the system.

Referring to FIGS. 8 and 9, the electromagnet power assembly 150 communicates with electromagnet assembly 130 to provide power to each respective outer coil 136 of the plurality of outer coils 136. In particular, electromagnet power assembly 150 includes at least one controller 160 of a plurality of controllers 160 in communication with a respective outer coil 136 of the plurality of outer coils 136 to control an amount and direction of current applied to each outer coil 136 based on a pole switching frequency dependent upon a rotational speed of the rotor assembly 120. The pole switching frequency controls how frequently the poles of the electromagnetic stacks 132 switch between polarities. This helps regulate operation of the motor 100 by allowing the poles of the electromagnetic stacks 132 to switch as the opposing rotors 124 rotate. The speed of rotation of the rotors 124 is dependent upon the pole-switching frequency in addition to their natural attraction to and repulsion away from one another and the electromagnetic stacks 132. The electromagnet power assembly 150 includes the timing gear 126 on at least one shaft 122A or 122B of the rotor assembly 120 and a photoelectric sensor 152 to regulate the pole switching frequency to the electromagnet power assembly 150. As specifically shown in FIG. 8, timing gear 126 includes a plurality of ridges 161 and recesses 162, and the photoelectric sensor 152 detects when ridges 161 and recesses 162 pass between a respective emitter and receiver of the photoelectric sensor 152 such that the pole switching frequency matches the rotational speed of the rotor assembly 120.

Referring to FIG. 9, one example embodiment of the electromagnet power assembly 150 includes a 5V DC power supply 156 for powering electronic components of the electromagnet power assembly 150 including the photoelectric sensor 152, an inverter 154 associated with the photoelectric sensor 152 and each controller 160 of the plurality of controllers 160. A large (>=40 V DC) power supply 158 is also included, passing through each respective controller 160 for providing electric current to the plurality of outer coils 136. Each controller 160 provides >=40 V DC power to each respective outer coil 136, however each controller 160 also switches a direction of the current applied to each outer coil 136 (illustrated as 40 v/0 v |0 v/40 v terminals on controller 160). This switching functionality is supported by photoelectric sensor 152 which interprets a rotational speed of the rotor assembly 120 into alternating (5 v/0 v) electrical signals, hereinafter alternating signal Q in FIG. 9. Alternating signal Q is passed to inverter 154, which produces an opposite alternating signal Q' such that both alternating signal Q (5 v/0 v) and opposite alternating signal Q' (0 v/5v) are passed to controller 160. Controller 160 switches direction of the >=40 V DC power applied to its assigned outer coil 136 of the plurality of outer coils 136 in response to alternating signal Q and its counterpart opposite alternating signal Q'. In the diagram of FIG. 9, only one controller 160 and its corresponding outer coil 136 is included, however the figure indicates connections where other controllers 160 and their corresponding coils 136 of the plurality of outer coils 136 are connected as well.

In particular, when a ridge 161 of the timing gear 126 passes in front of the photoelectric sensor 152, the electromagnet assembly 130 switches to a first polarity by providing power to the plurality of outer coils 136 such that current flows through the plurality of outer coils 136 in a first direction. When a recess 162 of the timing gear 126 passes in front of the photoelectric sensor 152, the electromagnet assembly 130 switches to a second polarity by providing power to the plurality of outer coils 136 such that current flows through the plurality of outer coils 136 in an opposite second direction. The ridges 161 and recesses 162 of the timing gear 126 as well as the assigned electromagnet polarities associated with each are arranged such that the polarity of the electromagnet assembly 130 is opposite to a polarity of the permanent magnets 125 positioned adjacent to the electromagnet assembly 130, as shown in FIG. 2.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A motor, comprising:
   a rotor assembly, comprising:
   a first shaft and a second shaft, each shaft of the first and second shafts being rotatable about a horizontal axis and wherein the first and second shafts are parallel relative to one another;
   a first rotor mounted on the first shaft and a second rotor mounted on the second shaft, the second rotor being positioned adjacent to the first rotor to form a rotor pair, each respective first or second rotor including a plurality of permanent magnets arranged annularly about the associated first or second shaft that each define an outer face having alternating first or second magnetic polarities; wherein the first rotor and the second rotor collectively define:
   a first pair of approaching permanent magnets of the plurality of permanent magnets, each respectively having outer faces that define a second magnetic polarity; and
   a second pair of approaching permanent magnets of the plurality of permanent magnets, each respectively having outer faces that define a first magnetic polarity and being positioned adjacent to the first pair of approaching permanent magnets; and
   an electromagnet assembly having a distal portion positioned proximal to the rotor assembly, the electromagnet assembly including one or more outer coils wrapped around one or more ferromagnetic cores;
   wherein application of electrical current in a first direction to the one or more outer coils energizes the distal portion of the electromagnet assembly with a first magnetic polarity that attracts the first pair of approaching permanent magnets towards the distal portion of the electromagnet assembly; and
   wherein subsequent reversal of the direction of the electrical current upon rotation of the first pair of approaching permanent magnets past the distal portion of the electromagnetic assembly energizes the distal portion of the electromagnet assembly with a second magnetic polarity that repels the first pair of approaching permanent magnets away from the distal portion of the electromagnet assembly to an advanced radial position and simultaneously attracts the second pair of approaching permanent magnets towards the distal portion of the electromagnet assembly.

2. The motor of claim 1, further comprising an electromagnet power assembly in electrical communication with the electromagnet assembly, wherein the electromagnet power assembly includes one or more controllers and wherein the one or more controllers are configured for reversing the direction of electrical current applied to each outer coil of the one or more outer coils.

3. The motor of claim 2, further comprising a timing gear associated with the first shaft or the second shaft, wherein the timing gear communicates with the electromagnet power assembly to initiate reversal of the direction of electrical current applied to each outer coil of the one or more outer coils.

4. The motor of claim 1, wherein the first rotor is caused to rotate in a first rotational direction and the second rotor is caused to rotate in a second rotational direction opposite from the first rotational direction by the distal portion of the electromagnet assembly when the distal portion of the electromagnet assembly is energized with the first magnetic polarity to attract the first pair of approaching permanent magnets, and when the distal portion of the electromagnet assembly is energized with the second magnetic polarity to repulse the first pair of approaching permanent magnets from the distal portion of the electromagnet assembly while simultaneously attracting the second pair of approaching permanent magnets to the distal portion of the electromagnet assembly.

5. The motor of claim 1, wherein the first and second shafts are caused to rotate as each associated rotor is caused to rotate by the electromagnet assembly.

6. A method, comprising:
providing a rotor assembly in association with an electromagnet assembly, the electromagnet assembly having a distal portion, comprising:
a first rotor mounted on a first shaft and a second rotor mounted on a second shaft, each first and second rotor including a plurality of permanent magnets arranged annularly about the associated first or second shaft that each define an outer face having alternating first or second magnetic polarities;
applying an electrical current in a first direction to one or more outer coils of the electromagnet assembly that energizes the distal portion of the electromagnet assembly with a first magnetic polarity that attracts a first pair of approaching permanent magnets of the plurality of permanent magnets of the first and second rotors towards the distal portion of the electromagnet assembly, the first pair of approaching permanent magnets each respectively having outer faces that define a second magnetic polarity; and
reversing, upon rotation of the first pair of approaching permanent magnets past the distal portion of the electromagnet assembly, the direction of the electrical current applied to the one or more outer coils of the electromagnet assembly to energizes the distal portion of the electromagnet assembly with an-a second magnetic polarity that repels the first pair of approaching permanent magnets away from the distal portion of the electromagnet assembly to an advanced radial position and simultaneously attracts a second pair of approaching permanent magnets of the first rotor and the second rotor towards the distal portion of the electromagnet assembly, the second pair of approaching permanent magnets each respectively having outer faces that define a first magnetic polarity and being positioned adjacent to the first pair of approaching permanent magnets.

7. The method of claim 6, wherein the first rotor rotates the first shaft in a first rotational direction and wherein the second rotor rotates the second shaft in an opposite second rotational direction.

8. The method of claim 6, wherein the first rotor mounted on the first shaft is associated with the second rotor mounted on the second shaft to form a rotor pair such that like magnetic poles of the permanent magnets of the first rotor and the second face one another.

9. The method of claim 6, wherein the electromagnet assembly electrically communicates with an electromagnet power assembly, wherein the electromagnet power assembly includes one or more controllers and wherein the one or more controllers are configured for reversing the direction of the electrical current applied to each outer coil of the one or more outer coils.

10. The method of claim 9, further comprising:
providing, by a timing gear associated with the first shaft or the second shaft, a signal to the one or more controllers that reverses the direction of electrical current applied to each outer coil of the one or more outer coils.

11. The method of claim 6, the distal portion of the electromagnet assembly being positioned between the first rotor and the second rotor to interact with the first pair of approaching permanent magnets and the second pair of approaching permanent magnets of the first rotor and the second rotor.

12. The method of claim 6, further comprising:
reversing, upon rotation of the second pair of approaching permanent magnets past the distal portion of the electromagnet assembly, the direction of the electrical current applied to the one or more outer coils of the electromagnet assembly to energize the distal portion of the electromagnet assembly with the first magnetic polarity that repels the second pair of approaching permanent magnets away from the distal portion of the electromagnet assembly to an advanced radial position and simultaneously attracts a third pair of approaching permanent magnets of the first rotor and the second rotor towards the distal portion of the electromagnet assembly, the third pair of approaching permanent magnets each respectively having outer faces that define a second magnetic polarity and being positioned adjacent to the second pair of approaching permanent magnets.

* * * * *